(12) United States Patent
Franz et al.

(10) Patent No.: US 10,655,735 B2
(45) Date of Patent: May 19, 2020

(54) SEAL ARRANGEMENT WITH SEALING FILM

(71) Applicant: Trelleborg Sealing Solutions Germany GmbH, Stuttgart (DE)

(72) Inventors: Martin Franz, Wannweil (DE); Bernhard Hahn, Esslingen (DE); Matthias Keck, Renningen (DE)

(73) Assignee: TRELLEBORG SEALING SOLUTIONS GERMANY GMBH, Stuttgart (DE)

( * ) Notice: Subject to any disclaimer, the term of this patent is extended or adjusted under 35 U.S.C. 154(b) by 0 days.

(21) Appl. No.: 16/015,133

(22) Filed: Jun. 21, 2018

(65) Prior Publication Data

US 2018/0299014 A1      Oct. 18, 2018

Related U.S. Application Data

(63) Continuation of application No. PCT/EP2016/082539, filed on Dec. 23, 2016.

(30) Foreign Application Priority Data

Dec. 23, 2015   (DE) .................. 10 2015 226 705

(51) Int. Cl.
   *F16J 15/32*      (2016.01)
   *F16J 15/322*     (2016.01)
   (Continued)

(52) U.S. Cl.
   CPC ......... *F16J 15/322* (2013.01); *F16J 15/3208* (2013.01); *F16J 15/3212* (2013.01);
   (Continued)

(58) Field of Classification Search
   CPC ...... F16J 15/164; F16J 15/322; F16J 15/3208; F16J 15/3212; F16J 15/3228; F16J 15/3244
   See application file for complete search history.

(56) References Cited

U.S. PATENT DOCUMENTS 2,105,871 A    1/1938   Vigne
2,723,048 A   11/1955   Welch
(Continued)

FOREIGN PATENT DOCUMENTS

DE    36 03 210 A1    8/1987
GB    1 196 451 A     6/1970
JP    50 45553 B2    10/2012

*Primary Examiner* — Gilbert Y Lee
(74) *Attorney, Agent, or Firm* — Hackler Daghighian Martino & Novak

(57) ABSTRACT

A seal arrangement has two machine parts movable toward one another along or about a movement axis. One of the two machine parts forms a seal holding structure and the other forms a sealing surface. A sealing device between the two machine parts is arranged on or in the seal holding structure, wherein the sealing device includes a sealing element and a pre-tensioning element which is separate from the sealing element and by means of which the sealing element is tensioned in the radial direction against the sealing surface of the respectively other machine part. The sealing element is formed by an elastically deformable sealing film. On the sealing film side, the pre-tensioning element forms an embossed structure which presses into the sealing film where the sealing film bears against the sealing surface with a contact pressure progression which corresponds to the embossed structure of the pre-tensioning element.

13 Claims, 7 Drawing Sheets

(51) Int. Cl.
*F16J 15/3212* (2016.01)
*F16J 15/3228* (2016.01)
*F16J 15/3244* (2016.01)
*F16J 15/3208* (2016.01)
*F16J 15/16* (2006.01)

(52) U.S. Cl.
CPC ....... *F16J 15/3228* (2013.01); *F16J 15/3244* (2013.01); *F16J 15/164* (2013.01)

(56) References Cited

U.S. PATENT DOCUMENTS

| | | |
|---|---|---|
| 5,308,087 A | 5/1994 | Schmitt |
| 6,688,603 B2* | 2/2004 | vom Schemm ...... F16J 15/3216 277/549 |
| 2003/0168817 A1 | 9/2003 | Iwakata et al. |
| 2007/0013143 A1* | 1/2007 | Schroeder .............. F16J 15/061 277/551 |

* cited by examiner

SEAL ARRANGEMENT WITH SEALING FILM

CROSS-REFERENCE TO RELATED APPLICATIONS

This continuation application claims priority to PCT/EP2016/082539 filed on Dec. 23, 2016 which has published as WO 2017/109163 A1 and also the German application number 10 2015 226 705.9 filed on Dec. 23, 2015, the entire contents of which are fully incorporated herein with these references.

DESCRIPTION

Field of the Invention

The invention relates to a seal arrangement with a sealing film.

BACKGROUND OF THE INVENTION

Seal arrangements having two machine parts which are arranged so as to be movable toward one another along a or about a movement axis, wherein one of the two machine parts realizes a seal holding structure and the respectively other machine part realizes a sealing surface, are known from practice. A sealing device which is arranged held on/in the seal holding structure serves for the dynamic sealing of a sealing gap realized between the two machine parts, said sealing device includes a sealing element and a pre-tensioning element which is separate from the sealing element and by means of which the sealing element is tensioned against the sealing surface of the respective other machine part in the radial direction.

Such seal arrangements have long been established, for example, as rotary seal arrangements where, for example, a rotatably mounted rotary shaft is sealed against a housing or a bearing part or also in the case of hydraulic cylinders with a piston which is guided inside the cylinder and is movable translationally.

In the case of commercially available seal arrangements, the sealing element is subject to wear not least because of its friction on the sealing surface of the respective machine part. This affects, in particular, structures of the sealing element which are essential for the sealing performance and also for the fluid return-conveying performance of the seal arrangement. A heavier and correspondingly more robust realization of the sealing part or sealing element in relation to mechanical loads additionally holds the risk of premature wear of structures essential to the functioning. In addition, there is the risk of thermally overloading the sealing element because the frictional heat generated in operation can no longer be adequately removed.

U.S. Pat. No. 2,105,871 A has disclosed a rotary seal arrangement where the sealing device includes a film-like sealing element produced from leather or from another oil-resistant material which bears sealingly against the sealing surface of a rotatably mounted axle. The sealing element, in this case, is pressed against the sealing surface of the axle by means of a simple garter spring. Said design does enable improved heat removal in the region of the sealing element. However, the seal arrangement is little suited to high-pressure applications. Over and above this, the individual windings of the garter spring arranged one behind another in the circumferential direction may only be spaced apart slightly—if at all—in order to ensure a sufficient sealing performance of the sealing device. As a result, a reliable return drag performance for the sealing device is not to be realized.

It is consequently the object of the invention to provide a seal arrangement which is cost-efficient to produce and where the sealing device comprises an improved return drag performance with a simultaneously improved service life.

Said object is achieved by the seal arrangement with the features specified in the independent claim. Preferred further embodiments of the invention are provided in the subclaims and the description.

SUMMARY OF THE INVENTION

In the case of the sealing arrangement according to the invention, the sealing element is formed by an elastically deformable sealing film, i.e. as a film sealing element. The pre-tensioning element forms an embossed structure which presses into the sealing film in such a manner that the sealing film bears against the sealing surface with a contact (surface) pressure which corresponds to the embossed structure of the pre-tensioning element or a contact pressure progression which corresponds thereto. Structures of the sealing device that are important to the sealing capability or the return-conveying capability of the sealing device, i.e. here the embossed structure of the pre-tensioning element, are no longer subject to any direct friction-induced wear as a result. The sealing film is realized substantially thinner than conventional sealing elements such that any frictional heat occurring during the operation of the seal arrangement is able to be quickly removed. Overall, the service life of the sealing device can thereby be clearly improved. By the sealing film being elastically deformable, a sufficient sealing capability can be realized even in the case of high-pressure applications where there is a fluid pressure of in excess of several hundred bars in the sealing gap. The sealing film preferably comprises a film thickness of between 0.1 millimeter and 2 millimeters, in particular between 0.2 millimeter and 1 millimeter. As a result, even a finely graduated (stepped) contact pressure progression of the sealing film on the sealing surface can be realized. In a preferred manner, the thickness of the sealing film is matched to or aligned with the diameter of the movably mounted machine part and can be, in particular, up to a hundredth of the diameter of the movably mounted machine part. Over and above this, the sealing film preferably bears loosely on the pre-tensioning element in the radial direction in the region of the embossed structure and is therefore neither bonded nor welded to the circumferential region of the pre-tensioning element comprising the embossed structure nor is it fastened directly in any another manner to said circumferential region.

The seal arrangement can be realized with a sealing device which seals externally in the radial direction or seals internally in the radial direction. A broad range of applications of the seal arrangement is produced as a result.

The embossed structure of the pre-tensioning element is realized as a thread according to a first embodiment of the invention. The thread comprises a thread or a thread groove which extends with at least one full winding, in a preferred manner with multiple full windings, about the movement axis of the two machine parts. As a result, the sealing film bears against the machine part comprising the sealing surface by way of a contact pressure progression which corresponds to the thread. The sealing film therefore comprises at least one helically extending first zone which bears against the sealing surface with a high amount of contact pressure. Said first zone correlates or aligns with thread tips of the embossed structure in the radial direction. A zone of the sealing film correlating with the thread groove or aligning with said thread groove in the radial direction bears in contrast against the sealing surface with a comparatively low(er) contact pressure. In particular where the seal arrangement is realized as a rotary seal arrangement, a (return) conveying of lubricant in the axial direction is made possible as a result. The return-conveying capability and the sealing action of the sealing device can be adjusted in a simple manner (among other things) by the choice of the gradient and of the axial length of the thread of the pre-tensioning element and of the free opening cross section of the thread groove.

The embossed structure of the pre-tensioning element can include, as an alternative to this, at least one annular bead which protrudes in the radial direction from the pre-tensioning element. As a result, the sealing film bears against the sealing surface of the other machine part in a circumferential region with a contact pressure progression which corresponds to the contact pressure progression of a conventional sealing edge. The annular bead, in this case, comprises according to the invention a first and a second (side) flank which are arranged aligned sloping to the sealing surface at various flank angles. The contact pressure progression of the sealing film is set up asymmetrically in such a manner with reference to the two sides of the sealing device, for example a high-pressure side of the seal arrangement and a low-pressure side of the seal arrangement, in order to simulate functionally different flank gradients of conventional seal edges. As a result, the return-conveying capability of the sealing device can be set up corresponding to requirement—in dependence on the direction of movement—when the two machine parts move translationally relative to one another along the movement axis. When combining an aforementioned thread with a circumferential annular bead, in a preferred manner at the end of the thread, the circumferential annular bead can also be realized with a symmetrical cross section, i.e. with flank angles that are identical on both sides or with a radius.

The annular bead of the pre-tensioning element can comprise according to the invention a wavy or zigzag-shaped progression in the circumferential direction of the pre-tensioning element. In the case of said embodiment, even when the pre-tensioning element has an annular bead embossed structure, it is also possible to set up in a reliable manner a return-conveying capability of the sealing device when the two machine parts rotate relative to one another. All in all, this is advantageous to the range of applications of the seal arrangement.

According to a preferred further development of the invention, the pre-tensioning element can comprise multiple of the aforementioned annular beads. The annular beads are arranged in said case lying one behind the other spaced apart from one another in the axial direction. A particularly good sealing capability of the sealing device can be achieved on the one hand as a result. The seal arrangement can be also be used, as a result, in high-pressure or extremely high-pressure applications and at the same time, with minimized wear susceptibility, ensures a reliable return-conveying capability for a fluid arranged in the sealing gap.

The pre-tensioning element can be realized, in particular, so as to be bend-proof in the radial direction, i.e. non-elastic. In the case of a pre-tensioning element which tensions inward in the radial direction, it is consequently not able to be widened or only widened insignificantly. In the case of a pre-tensioning element which tensions outward in the radial direction, it is consequently not able to be compressed or only compressed insignificantly in the radial direction. The pre-tensioning element consequently comprises an invariant external or internal cross section. As a result, the embossed structure of the pre-tensioning element can be converted, with a high local detail resolution, into contact pressure of the sealing film bearing against the sealing surface which corresponds thereto.

According to another embodiment of the invention, the pre-tensioning element is flexibly and elastically deformable (per se) in the radial direction. As a result, vibrations, in particular caused by unbalance, when a machine part rotates or eccentricities when a machine part is moved translationally are able to be damped or compensated for in a more efficient manner than is the case with a pre-tensioning element that is rigid in the radial direction. All in all, the sealing capability is improved as a result even when the respectively moved machine part has an eccentricity.

The pre-tensioning element can be realized in the simplest structural case as a helical spring element. Helical spring elements produced from various materials are commercially available pre-assembled in a cost-efficient manner. This provides cost and production advantages and enables the seal arrangement to be assembled in a particularly simple manner.

The pre-tensioning element can consist according to the invention of plastics material, in particular of a thermoplastic resin, a composite material or even metal. It is obvious that the pre-tensioning element can itself be realized so as to be elastically deformable in the radial direction by using a material with a high modulus of elasticity.

The sealing film can be realized according to the invention in the form of a seamless sleeve or in the form of wound sleeve. The seamless sleeve offers the advantage of the sealing film itself not comprising any structures whatsoever which interfere with the contact pressure progression, brought about by the embossed structures of the pre-tensioning element, of the sealing film bearing against the sealing surface. The sealing film is consequently present without any macroscopic structuring on its surface in the non-loaded or in the non-mounted state.

The sealing device can include a support or holding part which is separate from the sealing film and from the pre-tensioning element, by means of which the sealing device is supported and/or fastened on or in the seal holding structure. The support or holding part can also serve in particular for fastening one or both axial end portions of the sealing film. According to the invention, the support or holding part, in the event of the pre-tensioning element being realized rigid in the radial direction, can be elastically deformable in particular in the radial direction. It is possible to compensate for an eccentricity of the moving machine part as a result.

The sealing film comprises according to the invention preferably at least one end portion which extends radially in the direction of the machine part comprising the seal holding structure. The end portion, in this case, can be fastened on/in the seal holding structure. As a result, a floating bearing arrangement of the sealing device can be achieved. This is advantageous, in particular, with regard to compensating for an eccentricity of the movably mounted machine part. Over and above this, unwanted entrainment of the sealing device is prevented as a result.

The end portion of the sealing film can comprise a recess, by means of which a high-pressure side of the sealing gap can be fluidically connected to a space arranged between the sealing film and the pre-tensioning element and/or the support element. As a result, pressure-induced activation of the sealing film can be achieved. This is, in particular, advantageous when the seal arrangement is used with hydraulic drives.

In the event of the sealing device being realized sealing internally in the radial direction, and therefore the pre-tensioning element being realized tensioning internally in the radial direction, the sealing film extends at least in portions through an annular recess of the pre-tensioning element. The sealing film, in this case, can cover the pre-tensioning element at least in portions in the axial direction. As an alternative to this, the sealing device can be realized sealing externally in a radial manner.

The sealing film can consist, in particular, of polytetrafluoroethylene or of another elastically deformable material, in particular a polyolefin. The sealing film can comprise dry lubricants, in particular graphite or PTFE particles (polytetrafluoroethylene) to reduce its frictional resistance on the sealing surface further.

It is obvious that as an alternative to this or in addition to it, the machine part comprising the sealing surface can comprise a sliding coating in the region of the sealing surface.

According to the invention, one of the two machine parts can be a rotary shaft and the respectively other of the two machine parts a housing part and/or bearing part which encompasses the rotary shaft. As an alternative to this, one of the two machine parts can be a cylinder and the respectively other of the two machine parts a piston which is movable translationally (back and forth) in the direction of the movement axis in the cylinder.

BRIEF DESCRIPTION OF THE DRAWINGS

The invention is explained in more detail below by way of exemplary embodiments reproduced in the drawing, in which.

DETAILED DESCRIPTION OF THE PREFERRED EMBODIMENTS

Figure 1:
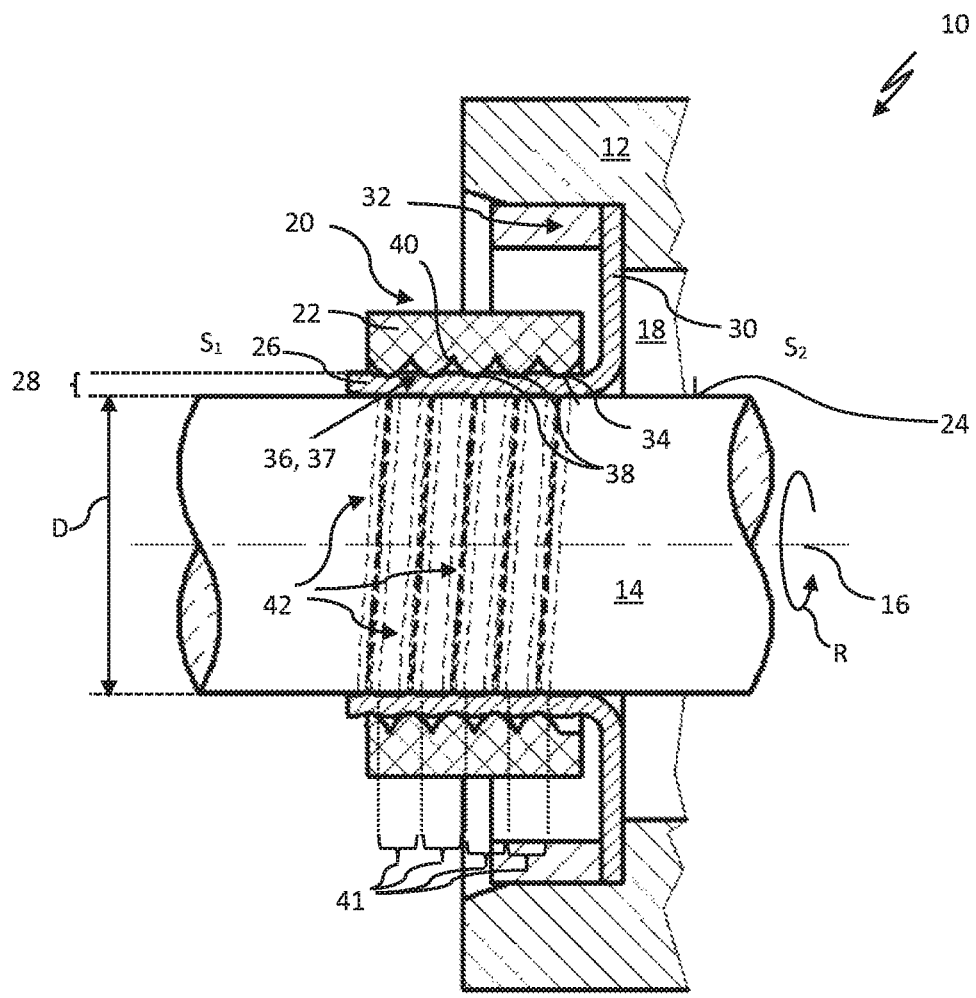
FIG. 1 shows a partially sectioned view of a seal arrangement with a sealing device which includes an elastically deformable sealing film and a pre-tensioning element with a thread-like embossed structure, by means of which the sealing film is pressed against the sealing surface with a contact pressure progression which corresponds to the embossed structure.

FIG. 1 shows a seal arrangement 10 which is realized as a rotary seal arrangement. The seal arrangement 10 comprises a first machine part 12 and a second machine part 14. The two machine parts 12, 14 are mounted so as to be rotatable toward one another about a movement axis, (i.e. a rotational axis) designated by the reference 16. The first machine part 12 is realized here as a housing and the second machine part 14 is realized here as a rotary shaft which is rotatable in relation to the housing. In a manner known per se, the housing can form a bearing arrangement for the rotary shaft which is not shown in any detail in the drawing. The two machine parts 12, 14 are arranged spaced apart from one another in the radial direction thereby realizing a sealing gap 18 arranged between the two machine parts 12, 14. A sealing device 20 serves for sealing the sealing gap 18. The sealing device includes a pre-tensioning element 22 and a sealing element which is pressed against a sealing surface 24 of the second machine part 14 in the radial direction by the pre-tensioning element 22. The pre-tensioning element 22 can be (toughly) elastically deformable or, as an alternative to this, also rigid in the radial direction, i.e. not elastically deformable or only insignificantly elastically deformable. An elastically deformable pre-tensioning element 22 is to be preferred whenever an eccentricity of the rotatably mounted machine part 14 is to be compensated for.

The sealing element is formed by an elastically deformable sealing film 26, i.e. is realized as a film sealing element. The sealing film 26 comprises a smooth surface without macroscopic structures on either side in the non-loaded or non-mounted state. The sealing film 26 can consist, in particular, of polytetrafluoroethylene (PTFE) or of another suitable sealing material, for example a polyolefin. The sealing film 26 comprises a thickness 28 of between 0.1 and of no more than 2 millimeters. The thickness 28 of the sealing film 26, in this case, can be matched, in particular, to the diameter D of the movably mounted machine part 14 and is preferably no more than a hundredth of the diameter D of the movably mounted machine part 14.

The sealing film 26 is present in the form of a seamless sleeve. An end portion 30 of the sealing film 26 is angled in the sense of a sealing collar and extends radially outward from the sealing surface 24 in the direction of the first machine part 12. The first machine part 12 comprises a groove-like seal holding structure 32 which serves for fastening the sealing device 20 non-rotatably on the first machine part 12. In the case of the exemplary embodiment shown in FIG. 1, just the sealing film 26 is arranged held in a clamped manner on or in the seal holding structure 32 by means of its end portion 30 or sealing collar. As a result, reliable sealing of the sealing gap (in the axial direction) is ensured. It is obvious that the sealing film 26 can bear directly against the pre-tensioning element 22 with its end face.

The pre-tensioning element 22 bears with its inside circumferential surface 34 directly against the sealing film 26 and presses said sealing film in the radial direction against the sealing surface 24 of the second machine part 14.

The circumferential surface 34 of the pre-tensioning element 22 on the sealing film side comprises an embossed structure 36. On the sealing film side, the pre-tensioning element 34 consequently comprises a (surface) topography which deviates from a smooth shell surface. The embossed structure 36 of the pre-tensioning element 22 is realized in the present case as a thread 37 with thread tips 38 and a single thread or one single thread groove 40. The thread groove 40 of the thread 37 extends in the axial direction about the movement axis 16 of the two machine parts 12, 14 with multiple full windings 41. It is obvious that the thread 37 can also be realized in a multi-start manner. In said case, the thread 37 consequently comprises multiple thread grooves 40 which are arranged so as to extend parallel to one another in a helical manner around the movement axis 16. The pre-tensioning element 22 is embossed into the elastically deformable sealing film 26 on account of the radial contact pressure against the sealing film 26 with its embossed structure 36. As a result, the sealing film 26 is pressed stronger against the sealing surface 24 of the second machine part 14 in the regions which cover the thread tips 38 of the thread 37 of the pre-tensioning element 22 in a radial manner than in the regions which cover the thread groove 40 in the radial direction or lie inside the thread groove 40. All in all, as a result, the sealing film 26 bears against the cylindrical sealing surface 24 of the second machine part 14 with a thread-like surface pressure progression or contact pressure progression 42 which correlates to the embossed structure 36. The embossed structure 36, here thread-shaped, of the pre-tensioning element 22 is consequently reproduced on the sealing surface 24 in the form of the contact pressure progression 42 of the sealing film 26. The contact pressure progression 42 is depicted graphically in FIG. 1 by the broken lines. The spatial density of the lines correlates with the extent of the respective contact pressure of the sealing film 26 against the sealing surface 24 per unit area. As a result of the thread-like or helical contact pressure progression 42 of the sealing film against the sealing surface, a fluid arranged in the sealing gap, for example lubricating oil, is conveyed back—depending on the direction of rotation of the second machine part 14—between the sealing film 26 and the sealing surface 24 in the axial direction to one of the two sides $S_1$, $S_2$ of the sealing device 20, i.e. is moved back in the axial direction. If the fluid, i.e. the lubricant, is stored, for example, on the right-hand side $S_2$ of the sealing device, fluid leaked to the side S1 is able to be conveyed back to the second side $S_2$ of the sealing device 10 in the axial direction as a result of rotating the second machine part 14 in the direction of movement R.

The correlation of the embossed structure 36 of the pre-tensioning element with the contact pressure progression 42 of the sealing film 26 against the sealing surface 24 is inversely proportional to the elastic deformability of the pre-tensioning element 22, to the thickness 28 of the sealing film 26 and is proportional to the deformability of the sealing film. The pre-tensioning element 22 is consequently matched to the deformability and the thickness 28 of the sealing film 26 with reference to its elastic deformability and to the radial tensioning force per unit area applied by the pre-tensioning element.

The pre-tensioning element 22 can consist of a suitable plastics material, in particular a thermoplastic resin, a composite material or metal. The pre-tensioning element can be realized, for example, as an injected molded part or as a component generated with 3D printing.

Figure 2:
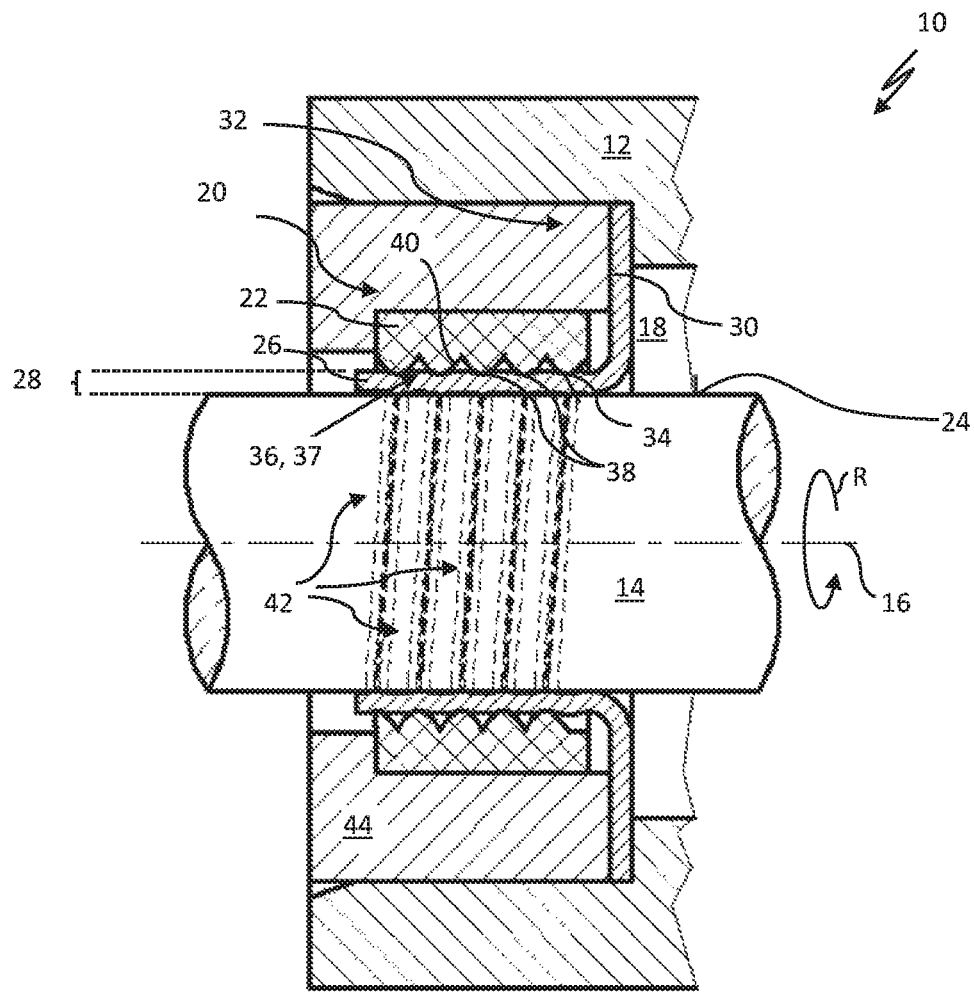
FIG. 2 shows a seal arrangement similar to the seal arrangement according to FIG. 1 where the sealing device includes a separate support part for the pre-tensioning element.

FIG. 2 shows a further seal arrangement 10. Said seal arrangement 10 differs from the seal arrangement 10 explained above in conjunction with FIG. 1 substantially in that the sealing device 20 additionally comprises, along with the pre-tensioning element 22 and the sealing film 26, a support element 44 which is realized separately from the other components, by means of which the pre-tensioning element 22 is supported in the radial direction on the first machine part 12. The support element 44 can be fastened in/on the seal holding structure of the first machine part 12.

Figure 3:
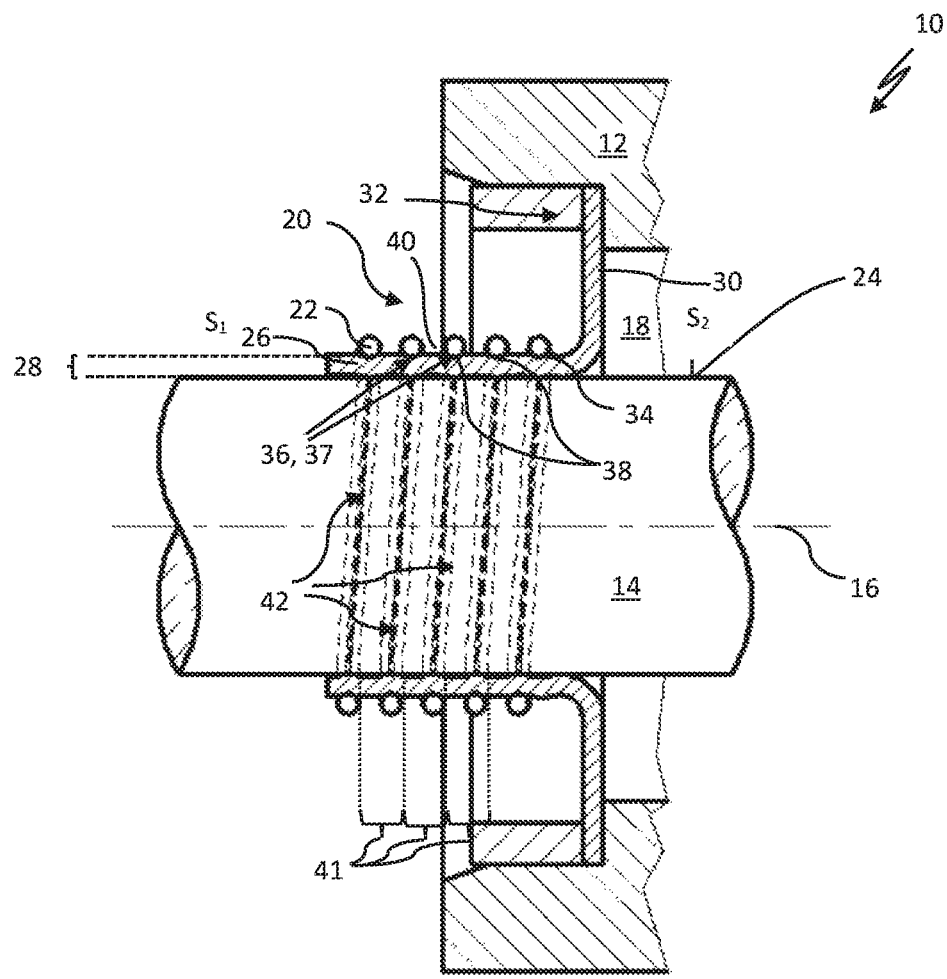
FIG. 3 shows a partially sectioned view of a further rotary seal arrangement where the pre-tensioning element is realized as a helical spring.

FIG. 3 shows a further seal arrangement 10, which differs from the seal arrangement 10 shown in FIG. 1 substantially in that the pre-tensioning element 22 is realized as a helical spring. The second machine part 14 extends through the windings 41 of the helical spring arranged lying one behind another in the axial direction. The helical spring preferably consists of metal but can also be formed from plastics material. The helical spring allows the rotary seal arrangement 10 to be assembled in a particularly simple manner. Helical springs are commercially available, furthermore, in arbitrary sizes and with various characteristic curves such that the rotary seal arrangement can be produced at low expenditure. On account of the fact that the sealing device 20 is fastened exclusively on the seal holding structure 32 of the first machine part 12 via the elastically deformable sealing film 26, the sealing device 20 is mounted overall in a floating manner. This allows for compensation of an eccentricity (radial movements) of the second machine part 14. Over and above this, axially directed relative movements of the two machine parts 12, 14 can be absorbed by the sealing device 22 without the sealing capability of the sealing device 20 being compromised as a result.

Figure 4:
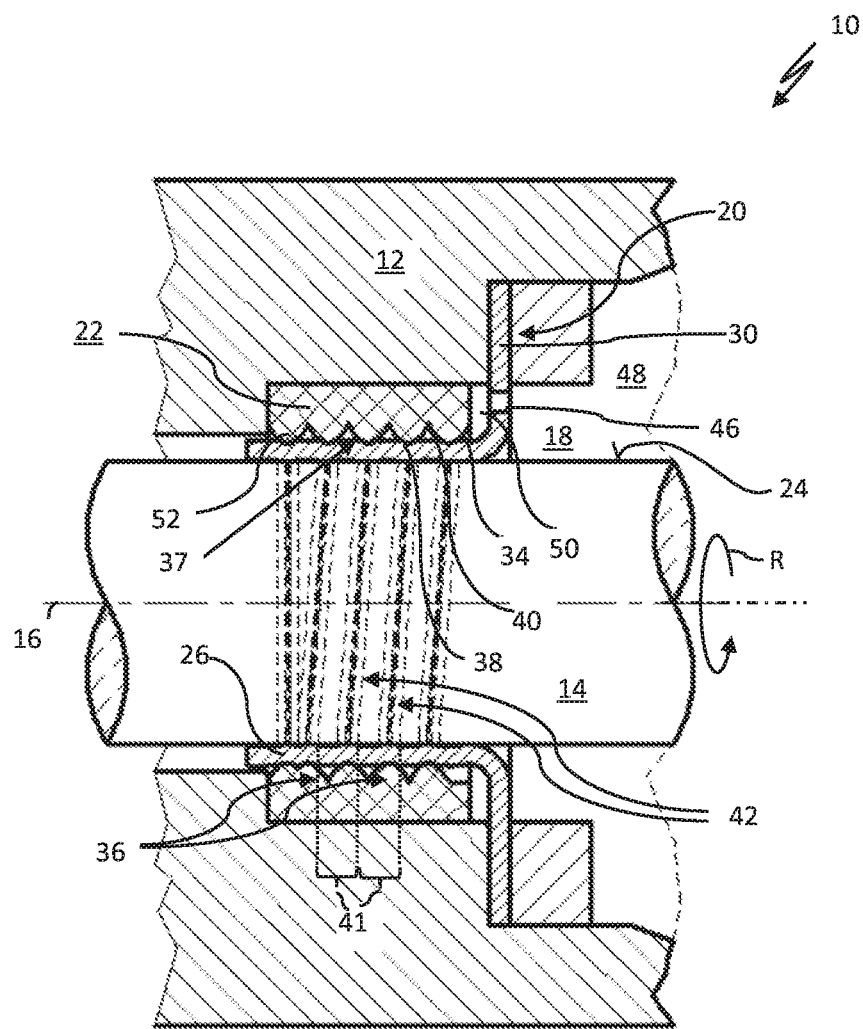
FIG. 4 shows a sectioned representation of a seal arrangement where the sealing film is provided with a pressure-equalizing through recess.

FIG. 4 shows a section through a further seal arrangement 10 which differs from the seal arrangement 10 shown in FIG. 2 substantially in that the sealing film 26 comprises a (through) recess 46 in the region of its axial end portion 30. If pressure is applied to a fluid arranged in the sealing gap on the high-pressure side of the seal arrangement 10 or of the sealing gap, which is designated by way of the reference 48, the fluid is able to flow in the axial direction via the recess 46 into an annular space 50 arranged between the sealing film 26 and the pre-tensioning element 22. As a result, an unwanted pressure gradient over the radially-extended end portion 30 of the sealing film 26 can be avoided, i.e. pressure equalization can be achieved. Over and above this, the sealing film 26 can be pressure-activated, i.e. pressed by the pressurized fluid additionally in the radial direction against the sealing surface 24 of the second machine part 14. The thread of the pre-tensioning element 22 can merge at one end into a radially circumferential sealing or annular bead 52 in order to ensure the sealing film 26 functions fully in a sealing manner even when the seal arrangement 10 is used in high-pressure applications. The annular bead 52 comprises a symmetrical cross section with a radius here.

Figure 5:
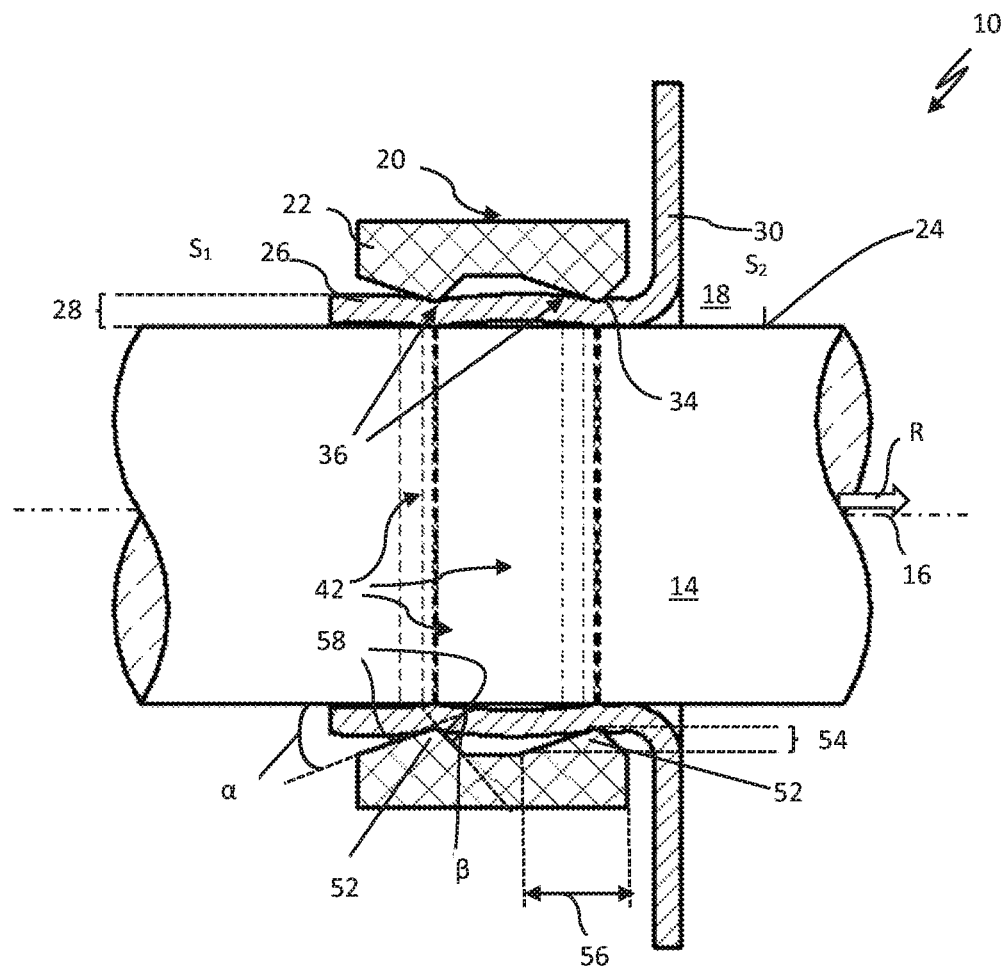
FIG. 5 shows a partially sectioned representation of a further seal arrangement with two machine parts which are movable translationally relative to one another along a movement axis, the pre-tensioning element tensioning the sealing film against the sealing surface comprising two annular beads on the inside in the radial direction.

FIG. 5 shows a partially exposed view of a seal arrangement 10, which differs from the seal arrangement shown in FIG. 1 substantially in that the pre-tensioning element 22 comprises an embossed structure 36 with annular beads 52. The annular beads can be designed variously with reference to their height 54, their axial width 56, the respective flank angle $\alpha$, $\beta$ of their side flanks 58 relative to the sealing surface 24 and to their flank form (bulbous vs. planar) in order to set up a respectively desired contact pressure progression 42 of the sealing film 26 against the sealing surface 24. The machine part 14 shown is preferably movable here in a translational manner in relation to the radially outer machine part which is not shown in FIG. 5. Care must be taken to ensure that the first flank angles α of the side flanks 58 of the annular beads 52 pointing to the first side $S_1$ of the seal arrangement are each smaller here than the second flank angles β of the side flanks 58 of the annular beads 52 pointing to the second side $S_2$ of the seal arrangement or sealing device. The annular beads 52 therefore comprise an asymmetrical cross section. When the second machine part 14 moves in the direction of movement R relative to the first machine part (not shown), a fluid arranged in the sealing gap 18 on the first side $S_1$ can be conveyed back in a simplified manner, as a result, in the axial direction to the second side $S_2$.

Figure 6:
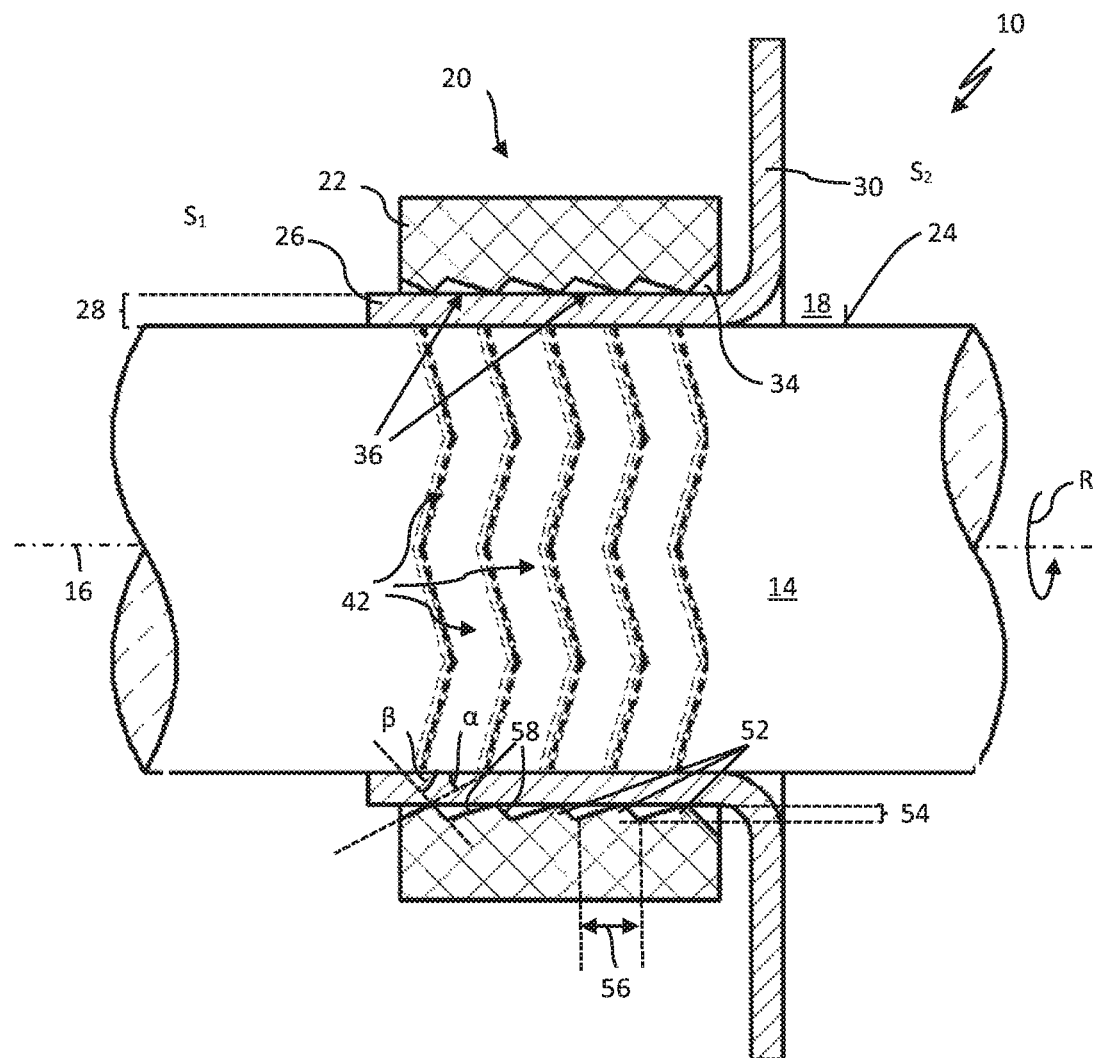
FIG. 6 shows a partially sectioned representation of a seal arrangement, with two machine parts which are arranged so as to be rotationally movable relative to one another about a movement axis, and with a sealing device where the pre-tensioning element comprises on the inside an embossed structure with multiple annular beads which are arranged lying one behind the other spaced apart from one another in the axial direction, the annular beads each comprising a zigzag-shaped progression in the circumferential direction of the pre-tensioning element such that the sealing film bears against the sealing surface of one of the two machine parts with a zigzag-shaped contact pressure progression which corresponds thereto.

FIG. 6 shows a seal arrangement 10 where the second machine part 14 is rotationally adjustable about the movement axis 16 relative to the first machine part (not shown; see FIG. 1). The annular beads 52 of the embossed structure of the pre-tensioning element 22 each comprise side flanks 58 which are arranged sloping at various flank angles α, β with respect to the sealing surface 24. In order to enable return-conveying of fluid arranged in the sealing gap 18 from the first side $S_1$ to the second side $S_2$ of the seal arrangement 10 when the second machine part 14 is adjusted rotationally about the movement axis 16, the annular beads 52 of the pre-tensioning element 22 comprise here a zigzag-shaped progression in the circumferential direction of the pre-tensioning element 22. It is obvious that the return-conveying of the fluid in the case of the seal arrangement shown in FIG. 6 is made possible even when the two machine parts 12, 14 are translationally adjustable relative to one another.

Figure 7:
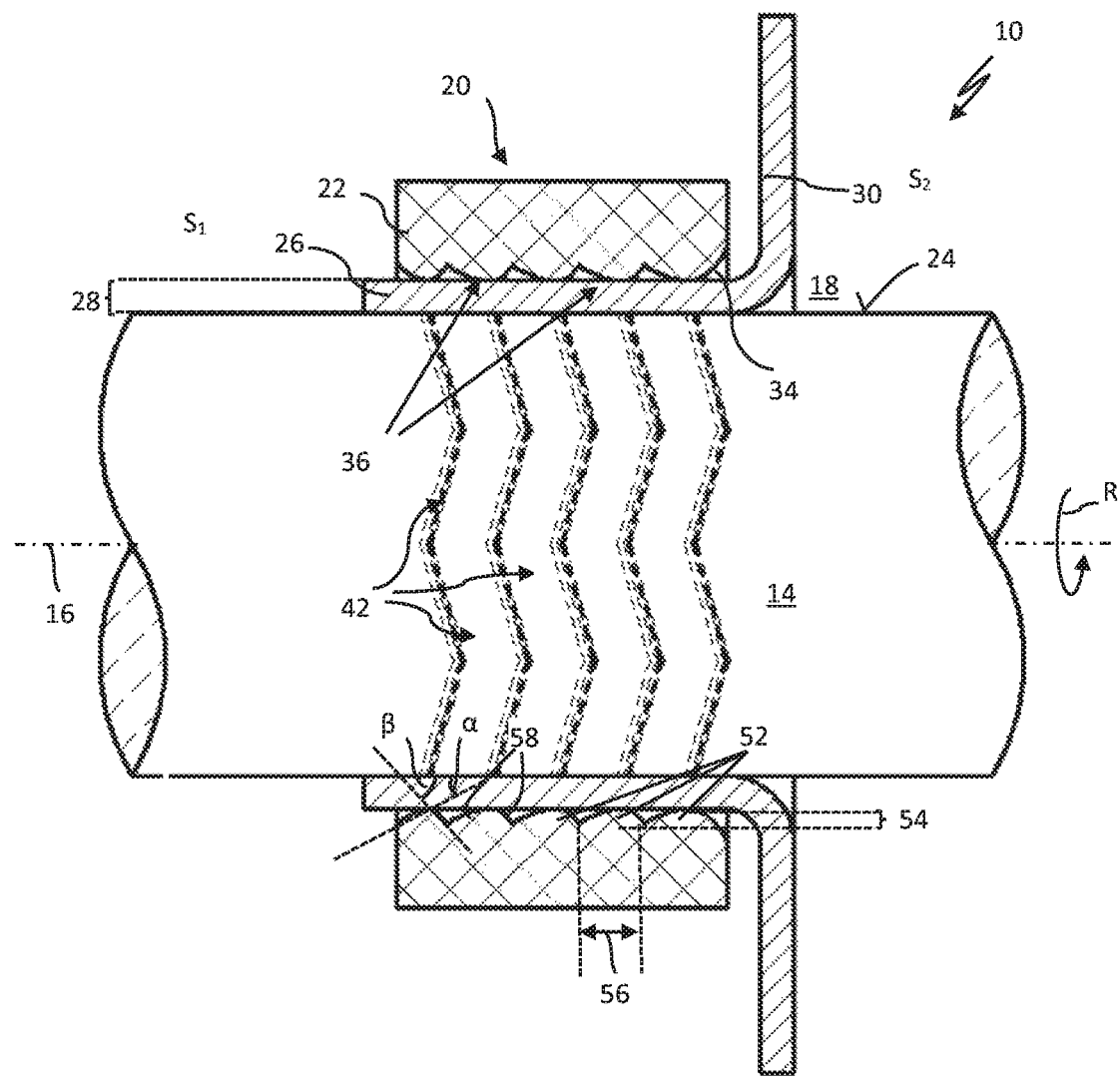
FIG. 7 shows a partially sectioned representation of a seal arrangement similar to the seal arrangement according to FIG. 6, where the annular beads each comprise a spherical or rounded cross sectional form.

According to the seal arrangement 10 shown in FIG. 7, the annular beads 52 can comprise a spherical asymmetrical cross sectional form at least in part or even overall.

According to exemplary embodiments not shown in any detail in the drawing, the seal arrangements can also comprise a sealing device 22 which seals externally in the radial direction. In said case, the sealing film 26 is tensioned radially outward against the sealing surface 24 of the radially outer machine part 12.

What is claimed is:

1. A seal arrangement, comprising:
   two machine parts which are arranged so as to be movable toward one another along a or about a movement axis, wherein one of the two machine parts realizes a seal holding structure and the respectively other machine part realizes a sealing surface;
   a sealing device which is held on/in the seal holding structure for the dynamic sealing of a sealing gap realized between the two machine parts;
   wherein the sealing device includes a sealing element and a pre-tensioning element which is separate from the sealing element and by means of which the sealing element is tensioned against the sealing surface of the respectively other machine part in the radial direction;
   wherein the sealing element is formed by an elastically deformable sealing film, the sealing film comprising a smooth surface without macroscopic structures on either side in the non-loaded or non-mounted state; and
   wherein the pre-tensioning element forms, on the sealing film side, an embossed structure in the form of an annular bead, which comprises a first and a second flank which are arranged sloping to the sealing surface at various flank angles α, β, and wherein the embossed structure presses in such a manner into the sealing film that the sealing film bears against the sealing surface with a contact pressure progression which corresponds to the embossed structure of the pre-tensioning element.

2. The seal arrangement as claimed in claim 1, wherein the annular bead comprises a wavy or zigzag-shaped progression in the circumferential direction of the pre-tensioning element.

3. The seal arrangement as claimed in claim 1, wherein the pre-tensioning element is realized so as to be elastically deformable in the radial direction or rigid, i.e. substantially non-deformable with reference to the cross section thereof.

4. The seal arrangement as claimed in claim 1, wherein the pre-tensioning element consists of a plastics material, a composite material, an elastomer material or a metal.

5. The seal arrangement as claimed in claim 1, wherein the sealing film is realized in the form of a seamless sleeve.

6. The seal arrangement as claimed in claim 1, wherein the sealing device comprises a support element, by means of which the pre-tensioning element is fastened and/or supported on the machine part comprising the seal holding structure.

7. The seal arrangement as claimed in claim 1, wherein the sealing film comprises an end portion which extends radially in the direction of the machine part comprising the seal holding structure and which is fastened on the seal holding structure of the one machine part.

8. The seal arrangement as claimed in claim 7, wherein the end portion of the sealing film comprises a recess, by means of which a high-pressure side of the sealing gap is fluidically connected to a space arranged between the sealing film and the pre-tensioning element and/or the support element.

9. The seal arrangement as claimed in claim 1, wherein the sealing film consists of polytetrafluoroethylene or an elastically deformable polyolefin material.

10. The seal arrangement as claimed in claim 1, wherein the sealing film comprises a thickness of between 0.15 mm and 2 mm, wherein the thickness is oriented to the diameter (D) of the movably mounted machine part.

11. The seal arrangement as claimed in claim 1, wherein the sealing device is realized sealing internally or sealing externally in the radial direction.

12. The seal arrangement as claimed in claim 1, wherein one of the two machine parts is a rotary shaft or a translationally movable piston and the respectively other of the two machine parts is a housing part and/or bearing part which encompasses the rotary shaft/the piston.

13. The seal arrangement as claimed in claim 1, wherein the sealing film comprising a thickness of between 0.1 and of no more than 2 millimeters.

* * * * *